US011323814B2

(12) United States Patent
Yoo

(10) Patent No.: US 11,323,814 B2
(45) Date of Patent: May 3, 2022

(54) VIBRATION SYSTEM USING SOUND

(71) Applicant: BEATSNINE INC., Seongnam-si (KR)

(72) Inventor: Ji Seung Yoo, Seoul (KR)

(73) Assignee: BEATSNINE INC., Seongnam-si (KR)

(*) Notice: Subject to any disclaimer, the term of this patent is extended or adjusted under 35 U.S.C. 154(b) by 357 days.

(21) Appl. No.: 16/604,569

(22) PCT Filed: Feb. 12, 2019

(86) PCT No.: PCT/KR2019/001680
§ 371 (c)(1),
(2) Date: Oct. 11, 2019

(87) PCT Pub. No.: WO2019/212132
PCT Pub. Date: Nov. 7, 2019

(65) Prior Publication Data
US 2021/0409867 A1    Dec. 30, 2021

(30) Foreign Application Priority Data

Apr. 30, 2018  (KR) .................. 10-2018-0049628
Nov. 5, 2018   (KR) .................. 10-2018-0134319

(51) Int. Cl.
*G10H 1/043*  (2006.01)
*G10H 1/16*   (2006.01)
*H04R 5/02*   (2006.01)
*B06B 1/02*   (2006.01)
*G06F 3/16*   (2006.01)

(52) U.S. Cl.
CPC ........... *H04R 5/023* (2013.01); *B06B 1/0207* (2013.01); *G06F 3/167* (2013.01); *H04R 2400/03* (2013.01)

(58) Field of Classification Search
CPC .... G10H 1/38; G10H 1/383; G10H 2210/056; G10H 2210/066; G10H 2210/081; G10H 2210/571; G10H 2210/576
USPC ............... 381/61–62, 118; 84/629, 630, 631, 84/635–637
See application file for complete search history.

(56) References Cited

U.S. PATENT DOCUMENTS

| | | | |
|---|---|---|---|
| 6,027,463 | A | 2/2000 | Moriyasu |
| 2008/0276793 | A1 | 11/2008 | Yamashita et al. |
| 2011/0029106 | A1 | 2/2011 | Isberg et al. |
| 2011/0228962 | A1 | 9/2011 | Taylor et al. |

FOREIGN PATENT DOCUMENTS

| | | |
|---|---|---|
| CN | 1953480 A | 4/2007 |
| CN | 105161087 A | 12/2015 |
| CN | 105848027 A | 8/2016 |
| CN | 106134218 A | 11/2016 |
| JP | 2003-029747 A | 1/2003 |
| KR | 10-1256565 B1 | 4/2013 |

(Continued)

*Primary Examiner* — George C Monikang
(74) *Attorney, Agent, or Firm* — Park, Kim & Suh, LLC

(57) ABSTRACT

Provided is a vibration system using sound. More particularly, the present invention relates to a system which is capable of generating vibration using sound so that the beats of the sound may be felt, is convenient to carry or move due to a lightweight and compact size thereof, is capable of generating vibration matching a beat of sound to which a user is currently listening, is capable of generating vibrations matching various feelings according to beats of sound on the basis of user setting, thereby greatly enhancing effects that the user may feel, and is very inexpensive to manufacture.

11 Claims, 4 Drawing Sheets

(56) References Cited

FOREIGN PATENT DOCUMENTS

| KR | 10-2014-0006424 | A | 1/2014 |
| KR | 10-2015-0143908 | A | 12/2015 |
| KR | 10-1620507 | B1 | 5/2016 |
| KR | 10-2018-0012397 | A | 2/2018 |

VIBRATION SYSTEM USING SOUND

CROSS-REFERENCE TO RELATED APPLICATIONS

This application is the National Stage filing under 35 U.S.C. 371 of International Application No. PCT/KR2019/001680, filed on Feb. 12, 2019, which claims the benefits of Korean Patent Application No. 10-2018-0049628, filed on Apr. 30, 2018, and Korean Patent Application No. 10-2018-0134319, filed on Nov. 5, 2018, the contents of which are all hereby incorporated by reference herein in their entirety.

TECHNICAL FIELD

The present invention relates to a vibration system using sound. More particularly, the present invention relates to a system which is capable of generating vibration using sound so that the beats of the sound may be felt, is convenient to carry or move due to a lightweight and compact size thereof, is capable of generating vibration matching a beat of sound to which a user is currently listening, is capable of generating vibrations matching various feelings according to beats of sound on the basis of user setting, thereby greatly enhancing effects that the user may feel, and is very inexpensive to manufacture.

BACKGCIRCULAR ART

There is a growing need for a method of providing an effect of circumstances synchronized with video or music through a sense of touch, i.e., a non-unpleasant physical stimulation, among the five senses of human beings to facilitate immersion in the video or the music, so that the psychology of people today who want to have unique and diverse experiences different from those when the video is watched or the music is listened to while depending mainly on a sense of vision or a sense of hearing may be reflected.

For example, when a movie is watched sitting on a chair of a theater, a large-scale event hall of an amusement park, or a three-dimensional (3D) theater, a chair, for experience of acoustic vibration, including a sound vibration device therein is generally used so that various circumstances in the movie can be indirectly experienced.

A representative example of such chairs is an acoustic vibration chair having a vibration device such as a transducer. The sound vibration chair is a system configured to vibrate according to sound of video, in synchronization with the sound and is high-priced equipment which includes a transducer, an analog frequency filter, an amplifier, etc. which are expensive devices.

In addition, such a sound vibration chair is a device that generates vibration by simply dividing an analog sound signal into analog sound signals according to frequency bands by an analog frequency filter or the like and directly inputting the analog sound signals to a vibrator such as a transducer and thus operates passively according to the strength of the analog sound signal. Therefore, a user cannot arbitrarily change or add vibration.

Accordingly, there is an urgent need for a vibration system which is capable of generating vibration using sound such that beats of the sound may be felt, is convenient to carry or move due to a lightweight and compact size thereof, is capable of providing various vibration effects according to beats and rhythms of sound that a user actually feels to give more excitement to the user, and is inexpensive to manufacture.

DETAILED DESCRIPTION OF THE INVENTION

Technical Problem

The present invention is directed to a vibration system capable of generating vibration using sound such that beats of the sound may be felt.

The present invention is also directed to a vibration system which is convenient to carry or move due to a lightweight and compact size thereof and is inexpensive to manufacture.

The present invention is also directed to a vibration system capable of giving various vibration effects according to beats and rhythms of sound that a user actually feels, thereby greatly enhancing an effect of listening to music.

Technical Solution

According to an aspect of the present invention, provided is a vibration system using sound, comprising: an application, for portable terminals, installed in a portable terminal; and a vibration device configured to generate vibration according to a vibration control signal from the application for portable terminals, wherein the application for portable terminals comprises: a fast Fourier transform (FFT) part configured to perform FFT to divide a digital sound signal converted from an analog sound signal provided via a microphone of the portable terminal, a digital sound signal streamed via the Internet, or a digital sound signal from a sound source file stored in an internal storage of the portable terminal into digital sound signals according to N frequency bands; a beat generation part configured to select a sound signal of a specific frequency band from among the N frequency-band digital sound signals and generate a beat from the selected sound signal; and a vibration signal generation part configured to generate a vibration control signal according to the beat generated by the beat generation part, and the application performs FFT on the digital sound signal to generate a control signal for control of the vibration device.

According to another aspect of the present invention, provided is the vibration system, wherein the beat generation part comprises an average power calculation part and a beat detection part, wherein the average power calculation part calculates in real time an average power level of the N frequency-ban digital sound signals output from the FFT part, and the beat detection part receives information regarding a moving average power level of the N frequency-band digital sound signals from the average power calculation part, selects a sound signal of a specific frequency band most appropriate for detection of beats, and identifies as a beat a point at which strength of the selected sound signal has a peak value.

According to other aspect of the present invention, provided is the vibration system, wherein the average power calculation part calculates the moving average power level of the N frequency-band digital sound signals output from the FFT part in real time.

According to other aspect of the present invention, provided is the vibration system, wherein the sound signal of the frequency band most appropriate for detection of beats comprises a low-frequency band signal with a highest degree of a change of the moving average power level.

According to other aspect of the present invention, provided is the vibration system, wherein the beat detection part identifies as a beat a point at which the selected signal of the specific frequency band has a peak value greater than or equal to a certain multiple of the moving average power level.

According to other aspect of the present invention, provided is the vibration system, wherein the beat generation part further comprises a period detection part and an output beat generation part, wherein the period detection part statistically analyzes beats detected by the beat detection part to identify bars of a score of a sound signal, and the output beat generation part generates an output beat matching the beat from the beat detected by the beat detection part and the bars of the score of the selected sound signal identified by the period detection part.

According to other aspect of the present invention, provided is the vibration system, wherein the bars of the score of the selected sound signal comprises a time interval and starting time of each of bars of the score played along a time axis.

According to other aspect of the present invention, provided is the vibration system, wherein the vibration device comprises: a housing; a vibrator mounted in the housing and configured to generate vibration; a vibration controller configured to receive the vibration control signal and control the vibrator according to the vibration control signal; and a power source configured to supply power to the vibrator and the vibration controller.

According to other aspect of the present invention, provided is the vibration system, wherein the vibrator comprises at least one motor.

According to other aspect of the present invention, provided is the vibration system, wherein the vibration controller comprises: a receiver comprising a receiving circuit configured to receive the vibration control signal; and a driver comprising a driving circuit configured to a driving signal to the vibrator according to the vibration control signal.

According to other aspect of the present invention, provided is the vibration system, wherein the vibration control signal comprises all vibration control signals for a plurality of vibration motors included in the vibration device, and is subject to a pulse width modulation method for control of rotational strength of the plurality of vibration motors.

According to other aspect of the present invention, provided is the vibration system, wherein the application for portable terminals provide a menu through which strength and type of vibration are selectable by a user.

Advantageous Effects

A vibration system using sound according to the present invention is capable of performing fast Fourier transform (FTT) on a digital sound signal to identify beats and beat periods corresponding to bars of a score in a digital manner and giving vibration with various rhythms and effects to a vibrator, thereby maximizing effects that a user may feel.

In addition, the vibration system using sound according to the present invention is convenient to carry or move due to lightweight and compact sizes thereof and is inexpensive to manufacture.

MODE OF THE INVENTION

Hereinafter, exemplary embodiments of the present invention will be described in detail with reference to the accompanying drawings. The present invention is, however, not limited thereto and may be embodied in many different forms. Rather, the embodiments set forth herein are provided so that this disclosure will be thorough and complete, and fully convey the scope of the invention to those skilled in the art. Throughout the specification, the same reference numbers represent the same elements.

Figure 1:
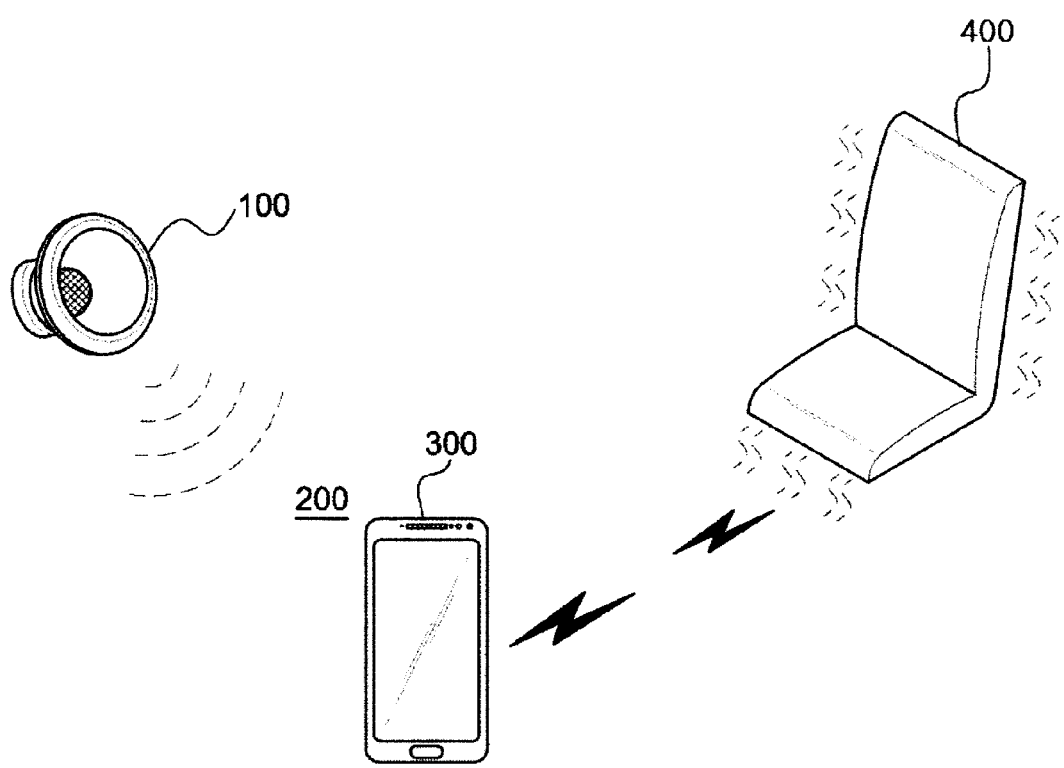
FIG. 1 is a diagram schematically illustrating a vibration system using sound according to the present invention.

FIG. 1 is a diagram schematically illustrating a vibration system using sound according to the present invention.

As illustrated in FIG. 1, the vibration system using sound according to the present invention may include an application 300, for portable terminals, installed in a portable terminal 200 to receive either a digital sound signal or a digital sound signal converted from an analog sound signal from a sound source 100 outside the system via the portable terminal 200 or to process a digital sound signal from a sound source file stored in an internal storage of the portable terminal 200; and a vibration device 400 configured to receive a control signal generated from a sound signal processed by the application 300 and generate vibration according to the control signal.

A type of the sound source 100 is not particularly limited, provided that an analog or digital sound signal can be provided therefrom. Generally, examples of the sound source 100 may include an audio device with a speaker, a TV, a monitor, a sound source streaming server, etc.

A type of the portable terminal 200 is not particularly limited, provided that the portable terminal 200 includes an input unit to receive a sound signal, a storage to store a sound source file, a processor having installed therein an application designed to generate a control signal by processing an input or stored sound signal, a transmitter configured to transmit the generated control signal wirelessly or via wire, etc. Examples of the portable terminal 200 may include a smartphone, a tablet personal computer (PC), etc. The portable terminal 200 may generate a control signal by processing the sound source file stored in the internal storage without receiving a sound signal from the outside.

A type of the vibration device 400 is not particularly limited, provided that the vibration device 400 includes a vibration controller configured to receive a control signal from the portable terminal 200 and drive a vibration unit according to the control signal, a vibrator having one or more vibration units such as vibration motors driven by the vibration controller, and the like. For example, the vibration device 300 may be in the form of a chair, a sofa, a cushion, a sitting cushion, a back of a chair or a sofa, a mat/pad, a bag, suspenders, clothing, etc. Particularly, when the vibration device 300 is in the form of the sitting cushion, the back of a chair or a sofa, the mat/pad, etc., the vibration device 300 may be used in various places with seats.

Figure 2:
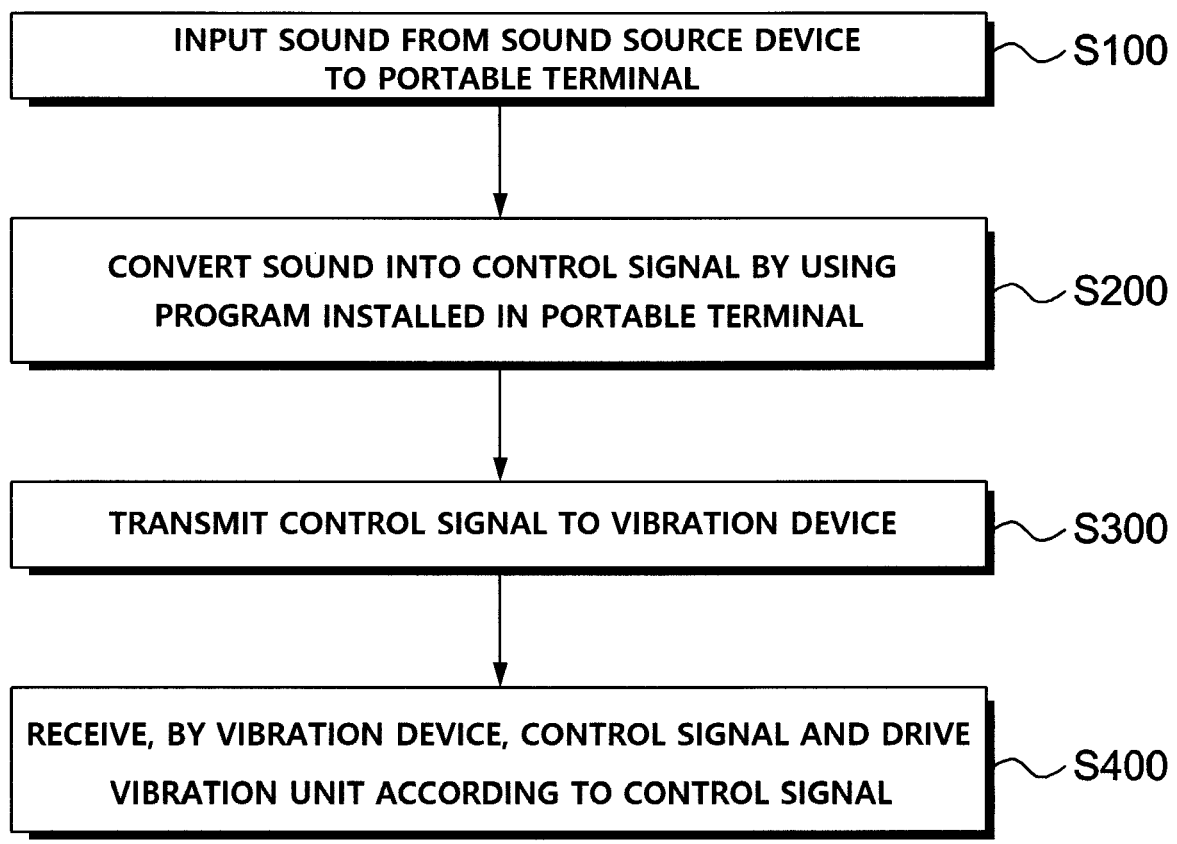
FIG. 2 is a flowchart sequentially illustrating an operating method of a vibration system using sound, according to the present invention.

FIG. 2 is a flowchart sequentially illustrating an operating method of a vibration system using sound, according to an embodiment of the present invention.

As illustrated in FIG. 2, a vibration system using sound according to an embodiment of the present invention may be operated by the method including operations to be described below. The operations may be simultaneously or simultaneously performed.

An analog or digital sound signal from the sound source 100 outside the system is input to the portable terminal 200 (operation S100).

The sound signal is converted into a control signal by a program installed in the portable terminal 200 (S200).

The control signal is transmitted to the vibration device 400 through the program 300 installed in the portable terminal 200 (S300).

Next, the vibration device 400 receives the control signal from the portable terminal 200 and is driven to generate vibration according to the control signal (S400).

In detail, in operation S100, the portable terminal 200 may receive the sound signal via a microphone or the like. In operation S200, the program installed in the portable terminal 200 may be, for example, a mobile application which may be downloaded and installed. In operation S300, the control signal may be transmitted through wireless communication using Bluetooth or Wi-Fi or wired communication using a Universal Serial Bus (USB) cable or the like. In operation S400, the vibration unit may include, for example, a brushless direct-current (BLDC) vibration motor or the like.

Figure 3:
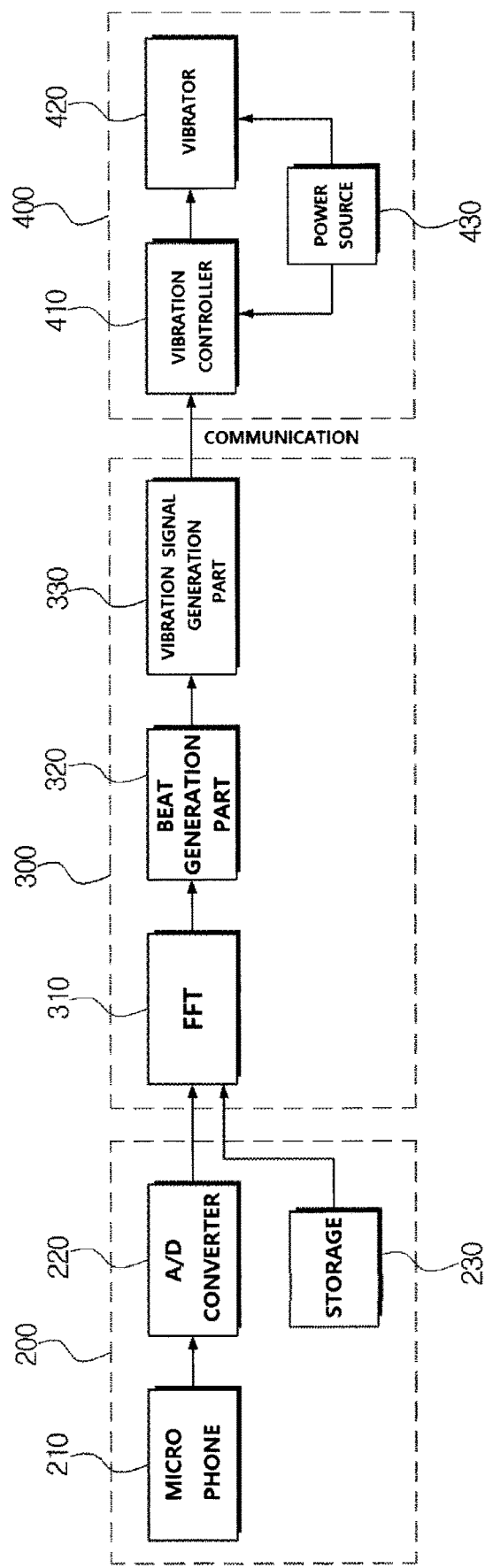
FIG. 3 is a schematic block diagram of a specific structure of a vibration system using sound according to the present invention.

FIG. 3 is a schematic block diagram of a specific structure of a vibration system using sound according the present invention.

As illustrated in FIG. 3, a portable terminal 200 may receive a digital sound signal or a digital sound signal converted from an analog sound signal from a sound source 100 via a microphone 210 or process a digital sound signal from a sound source file stored in an internal storage of the portable terminal 200 by using a program 300, for portable terminals, installed in the portable terminal 200.

In detail, in the application 300 for portable terminals, a fast Fourier transform (FFT) part 310 perform FFT to divide the digital sound signal into sound signals according to N frequency bands, a beat generation part 320 selects a sound signal of a specific frequency band and generates a beat from the selected sound signal, and a vibration signal generation part 330 generates a vibration control signal according to the beat generated by the beat generation part 320 and transmit the vibration control signal to the vibration device 400.

Here, the FFT is a mathematical technique for accurately dividing the digital sound signal into the N frequency-band digital signals without causing signal loss or addition of a sound signal, unlike a related art of dividing an analog sound signal into signals according to frequency bands by an analog frequency filter.

Figure 4:
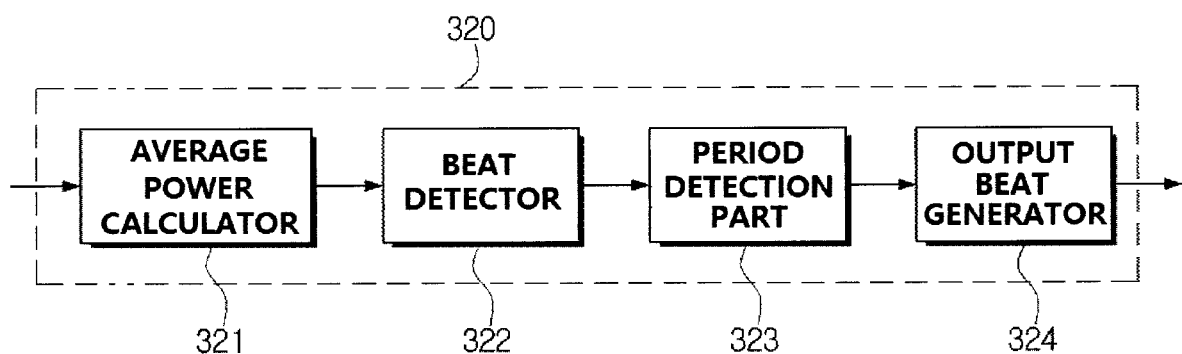
FIG. 4 is a schematic block diagram of a specific structure of a beat generation part illustrated in FIG. 3.

FIG. 4 is a schematic block diagram of a specific structure of the beat generation part 320 of FIG. 3.

As illustrated in FIG. 4, the beat generation part 320 of the application 300 for portable terminals may include an average power calculation part 321, a beat detection part 322, a period detection part 323, an output beat generation part 324, and the like.

In detail, the average power calculation part 321 continuously calculates in real time an average power level, particularly, a moving average power level, of N frequency-band digital sound signals output from the FFT part 310, particularly, low-frequency-band digital sound signals. Here, the moving average power level of the sound signals does not simply represent signal strength (volume) at a specific moment but refers to a factor representing an average of the signal strength at the specific moment and signal strength (volume) for a certain time period prior to the specific moment, i.e., general signal strength (volume).

The beat detection part 322 receives an average power level, particularly, a moving average power level, of the N frequency-band digital sound signals from the average power calculation part 321, and selects a sound signal of a specific frequency band most appropriate for detection of beats, e.g., a sound signal of which strength (volume) generally changes to a large extent. Generally, a beat is low-frequency sound such as drum sound and thus one of low-frequency signals is selected as a beat. The selected signal of the specific frequency band is observed in real time to detect, as a beat, a point at which the selected signal has a peak value.

Here, the peak value of the strength of the selected signal of the specific frequency band may be limited to time points at which the peak value is greater than or equal to a certain multiple of the moving average power level, e.g., the peak value is twice or more the certain multiple of the moving average power level, so as to prevent detection of an inappropriate beat.

The period detection part 323 statistically analyzes beats continuously detected by the beat detection part 322 to identify bars of a score of the selected sound signal. The identifying of the bars of the score should be understood to mean identifying a time interval (period) and starting time of each of bars of a score played along a time axis. When bars of a score of sound played in real time are identified, vibration with various rhythms matching beats may be freely and additionally provided.

Next, the output beat generation part 324 generates output beats with various rhythms matching actual beats of the sound according to user setting, based on the beat detected by the beat detection part 322 and the bars of the score of the selected signal identified by the period detection part 33, i.e., a time interval (period) and starting time of each of the bars played.

Therefore, the vibration signal generation part 330 generates the vibration control signal for driving a vibration motor or the like of a vibrator 420 of the vibration device 400 on the basis of the output beats generated by the output beat generation part 324, and transmits the vibration control signal to a vibration controller 410 of the vibration device 400 according to a communication standard via Bluetooth, Wi-Fi, wire communication, or the like. Here, various modifications may be made in the rhythm, strength, length, depth, etc. of the output beats according to the user setting.

When a plurality of vibration units such as vibration motors are included in the vibrator 420 of the vibration device 400, the vibration control signal may include all vibration control signals for the respective vibration units and be subject to a pulse width modulation method for control of rotational strength of the vibration units such as vibration motors.

The application 300 for portable terminals may provide a menu through which a user may select strength and type of vibration. For example, the strength of vibration may be automatically controlled according to the volume of sound or may be arbitrarily controlled by a user. Alternatively, one of predetermined rhythms may be selected and vibration with rhythm that a user wants may be output according to beats. The plurality of vibration units may be driven in the same way or differently. For example, vibration corresponding to fast beats may be implemented by a vibration unit included in a back of a chair or a pad and vibration corresponding to slow beats may be implemented by a vibration unit included in a seat of the chair or the pad, and the vibration units included in the back and seat of the chair or the pad may be alternately and repeatedly driven in the same way and differently according to a certain time pattern. Accordingly, the beats of sound may be felt in various ways using the vibration system using sound according to an embodiment of the present invention.

Figure 5:
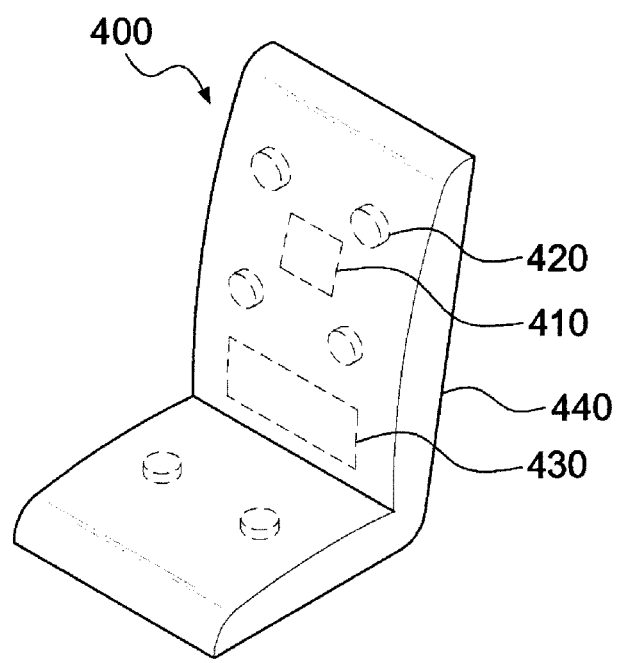
FIG. 5 schematically illustrates a structure of a vibration device illustrated in FIG. 1.

FIG. 5 schematically illustrates a structure of the vibration device 400 of FIG. 1.

As illustrated in FIG. 5, the vibration device 400 using sound according to the present invention may include a housing 440, a vibrator 420 mounted in the housing 440 to generate vibration, a vibration controller 410 configured to receive a vibration control signal from the application 300 for portable terminals and drive a vibration unit such as a vibration motor of the vibrator 420 according to the vibration control signal, a power source 430 supplying power to the vibrator 420 and the vibration controller 410, and the like.

A material and shape of the housing 440 may vary according to a type of the vibration device 400. The vibrator 420 may include at least one vibration unit such as a vibration motor. The at least one vibration unit may be arranged variously in the housing 440. The vibration controller 410 may include a receiver, e.g., a receiving circuit, which receives a control signal, and a driver, e.g., a driving circuit, which transmits a driving signal to each of the at least one vibration unit according to the control signal. The power source 430 may include a battery or a power cable.

The vibration device 400 using sound according to the present invention does not need a transducer included in a sound vibration device of a related art and generates vibration using the vibration unit such as a vibration motor. Accordingly, the weight and volume of the vibration device 400 may be minimized and thus the vibration device 400 is convenient to carry or move and is inexpensive to manufacture.

While the present invention has been described above with respect to exemplary embodiments thereof, it would be understood by those skilled in the art that various changes and modifications may be made therein without departing from the technical conception and scope of the present invention defined in the following claims. Accordingly, it is clear that all modifications are included in the technical scope of the present invention as long as they include the components as claimed in the claims of the present invention.

The invention claimed is:

1. A vibration system using sound, comprising:
an application, for portable terminals, installed in a portable terminal; and
a vibration device configured to generate vibration according to a vibration control signal from the application for portable terminals,
wherein the application for portable terminals comprises:
a fast Fourier transform (FFT) part configured to perform FFT to divide a digital sound signal converted from an analog sound signal provided via a microphone of the portable terminal, a digital sound signal streamed via the Internet, or a digital sound signal from a sound source file stored in an internal storage of the portable terminal into digital sound signals according to N frequency bands;
a beat generation part configured to select a sound signal of a specific frequency band from among the N frequency-band digital sound signals and generate a beat from the selected sound signal; and
a vibration signal generation part configured to generate a vibration control signal according to the beat generated by the beat generation part,
wherein the application performs FFT on the digital sound signal to generate a control signal for control of the vibration device,
wherein the beat generation part comprises an average power calculation part and a beat detection part,
wherein the average power calculation part calculates in real time an average power level of the N frequency-ban digital sound signals output from the FFT part,
wherein the beat detection part receives information regarding a moving average power level of the N frequency-band digital sound signals from the average power calculation part, selects a sound signal of a specific frequency band most appropriate for detection of beats, and identifies as a beat a point at which strength of the selected sound signal has a peak value.

2. The vibration system of claim 1, wherein the average power calculation part calculates the moving average power level of the N frequency-band digital sound signals output from the FFT part in real time.

3. The vibration system of claim 2, wherein the sound signal of the frequency band most appropriate for detection of beats comprises a low-frequency band signal with a highest degree of a change of the moving average power level.

4. The vibration system of claim 2, wherein the beat detection part identifies as a beat a point at which the selected signal of the specific frequency band has a peak value greater than or equal to a certain multiple of the moving average power level.

5. The vibration system of claim 1, wherein the beat generation part further comprises a period detection part and an output beat generation part,
wherein the period detection part statistically analyzes beats detected by the beat detection part to identify bars of a score of a sound signal,
wherein the output beat generation part generates an output beat matching the beat from the beat detected by the beat detection part and the bars of the score of the selected sound signal identified by the period detection part.

6. The vibration system of claim 5, wherein the bars of the score of the selected sound signal comprises a time interval and starting time of each of bars of the score played along a time axis.

7. The vibration system of claim 1, wherein the vibration device comprises:
a housing;
a vibrator mounted in the housing and configured to generate vibration;
a vibration controller configured to receive the vibration control signal and control the vibrator according to the vibration control signal; and
a power source configured to supply power to the vibrator and the vibration controller.

8. The vibration system of claim 7, wherein the vibrator comprises at least one motor.

9. The vibration system of claim 7, wherein the vibration controller comprises:
a receiver comprising a receiving circuit configured to receive the vibration control signal; and
a driver comprising a driving circuit configured to a driving signal to the vibrator according to the vibration control signal.

10. The vibration system of claim 7, wherein the vibration control signal comprises all vibration control signals for a plurality of vibration motors included in the vibration device, and is subject to a pulse width modulation method for control of rotational strength of the plurality of vibration motors.

11. The vibration system of claim 1, wherein the application for portable terminals provide a menu through which strength and type of vibration are selectable by a user.

* * * * *